(12) United States Patent
Kolibas

(10) Patent No.: US 6,718,689 B1
(45) Date of Patent: Apr. 13, 2004

(54) INSECTICIDE PACKET FOR BITING INSECTS

(76) Inventor: Michael J. Kolibas, 109 Hawthorne Ave., Colonia, NJ (US) 07067

( * ) Notice: Subject to any disclaimer, the term of this patent is extended or adjusted under 35 U.S.C. 154(b) by 0 days.

(21) Appl. No.: 10/346,509

(22) Filed: Jan. 17, 2003

(51) Int. Cl.[7] .................................................. A01M 1/20
(52) U.S. Cl. .......................................................... 43/131
(58) Field of Search ........................ 43/124, 131, 132.1

(56) References Cited

U.S. PATENT DOCUMENTS

| | | | |
|---|---|---|---|
| 3,826,036 A | | 7/1974 | Neugebauer |
| 3,931,692 A | | 1/1976 | Hermanson |
| 4,218,843 A | | 8/1980 | Clarke, Jr. |
| 4,228,614 A | | 10/1980 | Cardarelli |
| 4,631,857 A | | 12/1986 | Kase et al. |
| 4,804,142 A | * | 2/1989 | Riley ........................... 239/56 |
| 4,879,837 A | | 11/1989 | Capizzi et al. |
| 4,932,155 A | * | 6/1990 | Friemel et al. ............... 43/125 |
| 5,046,280 A | | 9/1991 | Foster et al. |
| 5,359,808 A | * | 11/1994 | Fitsakis ...................... 43/132.1 |
| 5,595,018 A | | 1/1997 | Wilbanks |
| 5,657,576 A | | 8/1997 | Nicosia |
| 5,731,055 A | * | 3/1998 | Bernardo ...................... 428/76 |
| 5,775,026 A | | 7/1998 | Pearce et al. |
| 5,896,697 A | | 4/1999 | Kang |
| 6,050,025 A | | 4/2000 | Wilbanks |
| 6,145,236 A | * | 11/2000 | King ............................... 43/1 |
| 6,185,861 B1 | | 2/2001 | Perich et al. |
| 6,425,202 B1 | | 7/2002 | Lin et al. |
| 6,463,695 B2 | * | 10/2002 | McDonough ................. 43/131 |

OTHER PUBLICATIONS

Suzy Hansen, "Blood Lust", <http://archive.salon.com/books/int/2001/08/20/mosquito/print.html>, (Nov. 4, 2002).
"Mosquito Facts", <https://www.gcinternet.net/internetvets/articles/mosquitofactsaug2002.htm>, (Nov. 4, 2002).
Donald J. Sutherland and Wayne J. Crans, "Mosquitoes in Your Life", <http://www–rci.rutgers.edu/~insects/moslife.htm>, (Nov. 4, 2002).
Steven Hunt, "Mosquitoes Find Some People Tastier Than Others", <http://exn.ca/Templates/printstory.asp?PageName=Discovery&story id=1999082352>, (Nov. 4, 2002).
"Golden Saltmarsh Mosquito", <http://www.chesapeakebay.net/info/aedes solicitans.cfm>, (Nov. 4, 2002).
"The Mosquito Trap U.S.A.", <http://www.conforthouse.com/comfort/inreppesrepi.html>, (Nov. 4, 2002).
G.F. O'Meara, "The Eastern Saltmarsh Mosquito Aedes Sollicitans", <http://www.rci.rutgers.edu/~insects/sp7.htm>, (Nov. 4, 2002).
"Malaria: General Information", <http://www.cdc.gov/travel/malinfo.htm>, (May 5, 2003).
"Mosquito Born Diseases", <http://www.cdc.gov/ncidod/diseases/list mosquitoborne.htm>, (May 5, 2003).
Abstract of "The African Malaria Report", World Health Organization, 1211 Geneva 27, Switzerland and UNICEF, UNICEF House, 3 UN Plaza, New York, NY 10017, 2003, pp.1–5, <http://mosquito.who.imt/amd2003/report–e.pdf>, (viewed on May 5, 2003).

* cited by examiner

Primary Examiner—Robert P. Swiatek
Assistant Examiner—Bethany L Griles
(74) Attorney, Agent, or Firm—McCarter & English, LLP

(57) ABSTRACT

An insecticide packet for killing biting insects comprises an envelope enclosing an insecticide and having a permeable web that is penetrable by the mouthparts of a biting insect. The permeable web allows insect attractants to migrate from within the envelope to the ambient environment. The envelope may be enclosed within an outer protective pocket. The insecticide packet is provided with a plurality of pins extending outwardly from the packet to discourage non-targeted animals from attempting to ingest the envelope or its contents. The packet is provided with a buoyant support arranged so that the permeable web is above the water line when the packet floats on the surface of a water body. The insecticide includes a stomach poison mixed with a liquid food that is preferred by the biting insects, such as cattle blood. Volatile insect attractants may be added to the mixture of stomach poison and food.

17 Claims, 5 Drawing Sheets

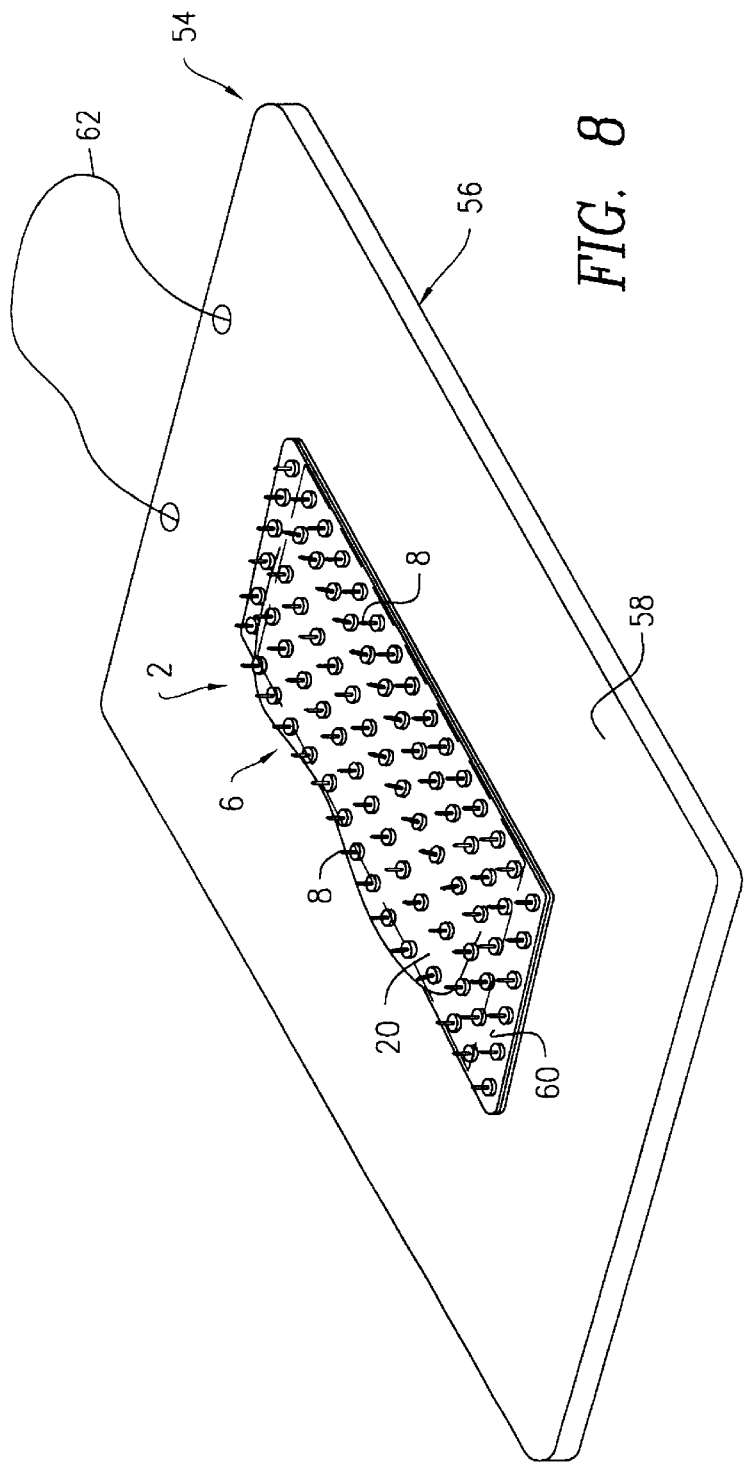
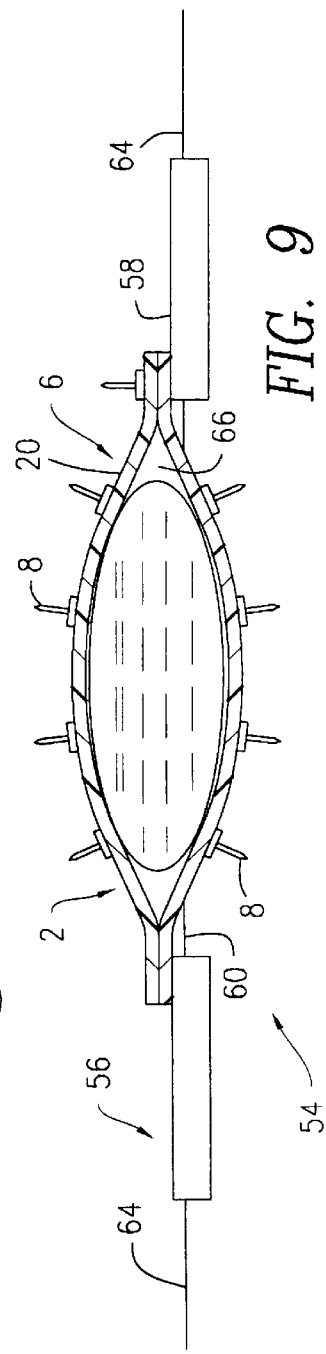

INSECTICIDE PACKET FOR BITING INSECTS

FIELD OF INVENTION

The present invention is directed to insecticidal devices. More particularly, the present invention is directed to devices for the deployment of insecticides to kill mosquitoes and other biting insects.

BACKGROUND OF INVENTION

Mosquitoes and other biting flies are prevalent throughout every region inhabited by humans. Besides presenting an ongoing nuisance, these pests serve as the vectors for transmission of blood-borne diseases between species of warm-blooded animals (i.e., birds and mammals). The disease organisms, such as the West Nile virus, which is spread by the common mosquito culex pipiens, are carried in the blood meals taken by the adult females of the biting insect species.

Adult biting flies may live on more than one food source, but the female requires one or more blood meals to produce eggs. The female insect surveys the ambient environment for suitable sources of blood, relying first on chemical signals in the atmosphere, then on more prey-specific signals such as movement, body heat, color contrast, and the presence of certain organic compounds. Once the blood meal has been digested, the female must deposit her eggs in water or in a damp environment subject to flooding, where the subsequent stages of development and growth take place.

A common technique of controlling mosquitoes and other biting insects is to deposit poisonous substances into the preferred breeding environments of the targeted insect species, typically as an insecticide spray or fog. There are a number of disadvantages to using sprays or fogs for insect control. For example, it is difficult to limit the exposure of non-targeted species to the poisonous substances that are deposited in the treated areas. Moreover, the insecticides may be transported some distance away from the treated areas as aerosols or in water. Excessively large amounts of the insecticides may be required to ensure adequate control of the insects within the treated areas. The insecticides themselves may be quite expensive, particularly if they are specifically toxic to the targeted biting insects.

A number of devices for killing adult insects attempt to attract the insects to the device, using one or more of a variety of lures selected according to the natural feeding or reproductive behavior of the targeted insects. Representative types of such devices are disclosed in the following U.S. patents:

U.S. Pat. No. 3,826,036 discloses a packet-like insect killing device that employs a substrate with a pheromone attractant and a chemical insecticide for attracting and killing insects. The substrate is held within a cage-like enclosure that facilitates handling the device while avoiding contact between non-targeted animals and the insecticide.

U.S. Pat. No. 3,931,692 discloses a layered device having insecticide-laden food particles within a perforated fibrous web for attracting and killing cockroaches. The disclosed device also includes wing-like features extending from a bottom web for handling and positioning the device while avoiding contact with the insecticide. U.S. Pat. Nos. 4,879,837, 5,046,280 and 5,775,026 each disclose small devices that utilize pheromones or other chemical attractants and a contact poison for killing the insects attracted to the target.

The device disclosed in U.S. Pat. No. 5,046,280 includes a mesh covering over the substrate containing the attractant and poison to prevent non-targeted animals from coming in contact with the poison. As discussed in U.S. Pat. No. 5,775,026, the use of contact poisons becomes problematic in humid or wet environments, such as the flooded areas where mosquitoes and other biting flies breed.

U.S. Pat. Nos. 5,595,018, 5,657,576, 6,050,025 and 6,425,202, disclose devices that employ bait to attract mosquitoes to electric coils where the mosquitoes are then killed by electrocution. The bait in these devices generally simulates the physical characteristics of prey such as heat (U.S. Pat. No. 5,595,018) or, in the more sophisticated devices, odoriferous substances or warm, pulsing fluid (U.S. Pat. Nos. 5,657,576, 6,050,025 and 6,425,202). The disclosed devices use electricity, rather than poison, to kill the insects, and are poorly suited for use in remote areas or in areas that are wet or flooded.

Other U.S. patents disclose devices for dispensing insecticides into the water bodies where biting flies pass through their larval or nymphoid stages of development. For example, U.S. Pat. Nos. 4,631,857, 4,218,843 and 4,228,614 disclose insecticide delivery devices that are designed to float upon the surfaces of water bodies while dispensing poisons or microorganisms to kill larvae or nymphs in the ambient water environment.

SUMMARY OF INVENTION

The present invention is directed to insecticide packets for preferentially delivering poison to adult female biting insects in an inexpensive and environmentally safe manner.

A preferred embodiment of the insecticide packet comprises an envelope for enclosing an insecticide for ingestion by a biting insect. The envelope includes a permeable web that is penetrable by the mouthparts of a biting insect, such that volatile substances (e.g, insect attractants) within the envelope will migrate to the ambient environment. The envelope also includes a plurality of pins extending outwardly from the envelope to discourage non-targeted animals from attempting to ingest the envelope or its contents.

In another preferred embodiment, the envelope of the insecticide packet is protected by an outer pocket. The pocket is provided with a second permeable web that is in contact with permeable web of the envelope to facilitate the migration of volatile substances from the envelope to the ambient environment. A plurality of pins extends outwardly from the pocket.

In yet another preferred embodiment, the envelope of the insecticide packet is enclosed within a pocket that has holes to expose the permeable web of the envelope to the ambient environment.

Another preferred embodiment of the present invention includes an insecticide packet and a buoyant support arranged so that at least a portion of the permeable web of the envelope is above the water line when the packet and buoyant support float on the surface of a water body.

Preferably, the insecticide includes a stomach poison for the types of biting insect targeted by the insecticide package mixed with a food that is preferred by the biting insects. For example, a combination of boric acid and cattle blood may be effective to kill female biting insects, including mosquitoes. Volatile organic compounds, such as odoriferous compounds from the food itself, may also be included with the insecticide to attract the biting insects to the insecticide packet.

DESCRIPTION OF DRAWINGS

For a more complete understanding of the present invention, reference is made to the following detailed description of the present invention considered in conjunction with the accompanying drawings, in which:

FIG. 8 is a perspective view of a preferred embodiment of an insecticide packet assembly having a buoyant supporting member; and FIG. 9 is a cross-sectional view of the insecticide packet assembly of FIG. 8 at rest on the surface of a water body.

DETAILED DESCRIPTION OF INVENTION

Figure 1:
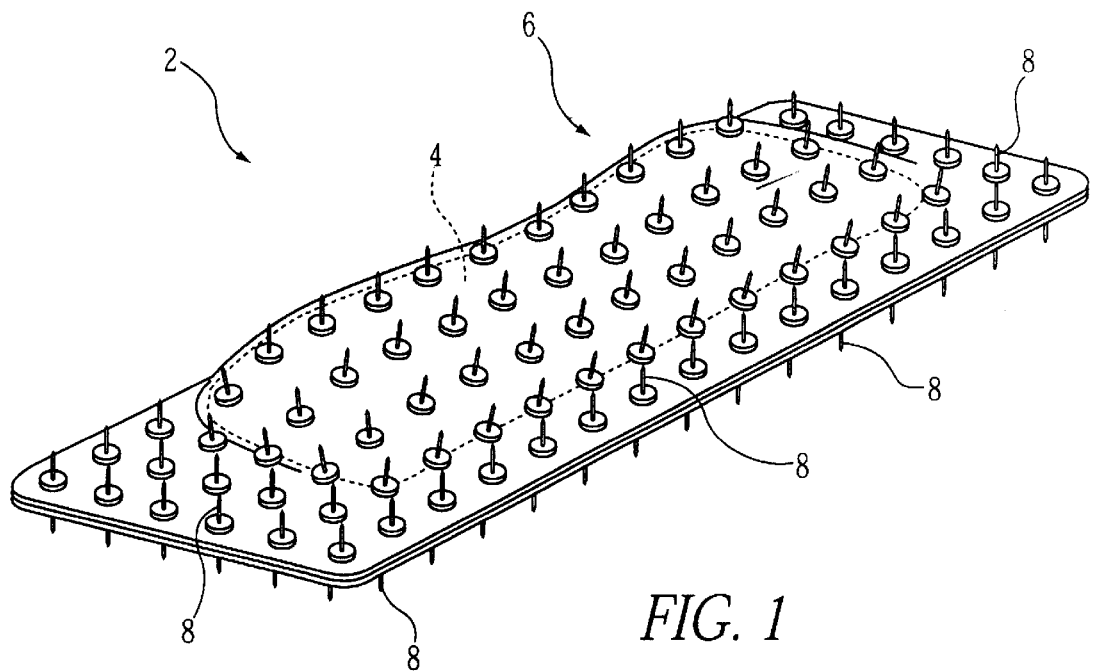
FIG. 1 is a perspective view of a first preferred embodiment of an insecticide packet according to the present invention.

Referring to FIG. 1, a preferred embodiment of a packet 2 for deploying insecticide to kill biting insects, such as mosquitoes and other biting flies, comprises an envelope 4, for enclosing an insecticidal composition, within an outer pocket 6. The outer pocket 6 is provided with a plurality of pins 8 that extend outwardly from the outer pocket 6 to discourage non-targeted animals from attempting to ingest the packet 2 or its contents. Preferably, the packet 2 is small in size, on the order of 2 inches wide by 4 inches, or smaller.

Figure 2:
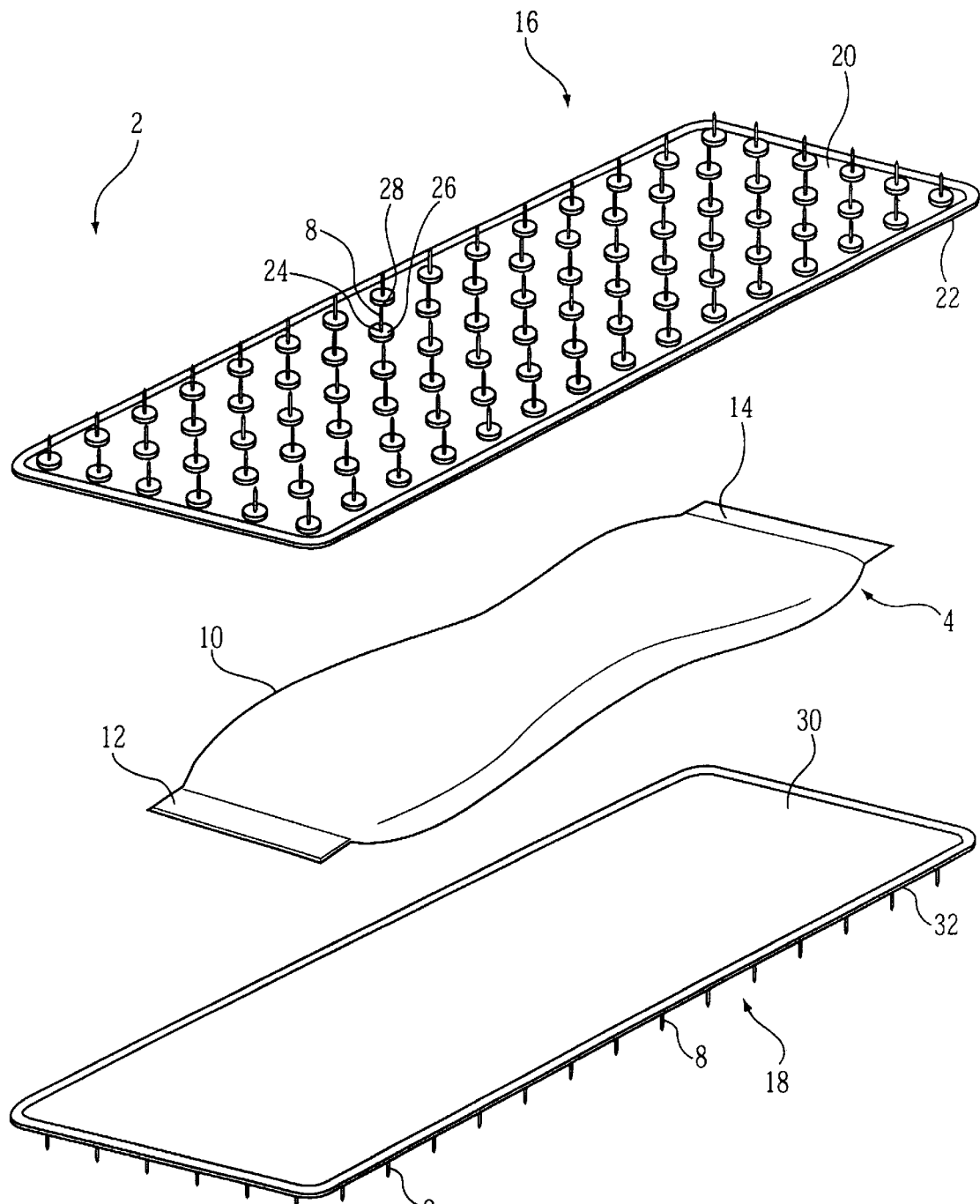
FIG. 2 is an exploded view of the insecticide packet of FIG. 1.

FIG. 2 presents an exploded view of the packet 2. Referring to FIG. 2, the envelope 4 comprises a permeable web 10, preferably in the shape of a tube that can be penetrated by the mouthparts of a biting insect. The opposing ends 12,14 of the envelope are sealed to enclose the insecticidal composition. The permeable web 10, preferably, is permeable to gases but impermeable, or repellent, to liquids, especially to water, so that volatile chemicals that attract the biting insects may pass through the web 10 while the bulk of the insecticidal composition is retained within the envelope 4. A number of suitable gas-permeable web materials are known to the art, including cellulosic materials such as onionskin paper, Kraft paper and membranes of chemically modified cellulose. Gas-permeable membranes that are also water-repellent may be fabricated from such materials as spun-bonded polyolefins, spun-bonded polyesters, and expanded polytetrafluoroethylene.

The pocket 6 has an upper panel 16 and a lower panel 18 that may be joined to each other to enclose the envelope 4. The upper panel 16 includes a web 20 with an edge 22 that is adapted to be sealed to the lower panel 18 of the pocket 6. The web 20 is fabricated from a gas-permeable material which, preferably, is also water-repellent, and which can be penetrated by the mouthparts of a biting insect. Suitable materials for the web 20 may be selected from those that have been discussed hereinabove as being suitable for the permeable web 10.

The upper panel 16 of the pocket 6 is provided with a plurality of pins 8 extending upwardly from the web 20. The pins 8 are attached to the web 20 at the inner end 24 of each pin 8 by an attachment element 26 that is bonded to the web 20. The pins 8 are constructed of a rigid material and may be sharp at their outer ends 28. Preferably, the pins 8 are constructed of a metal that is resistant to corrosion in wet environments, such as a bronze or a stainless steel. The pins 8 may also be formed from a rigid plastic material.

Figure 3:
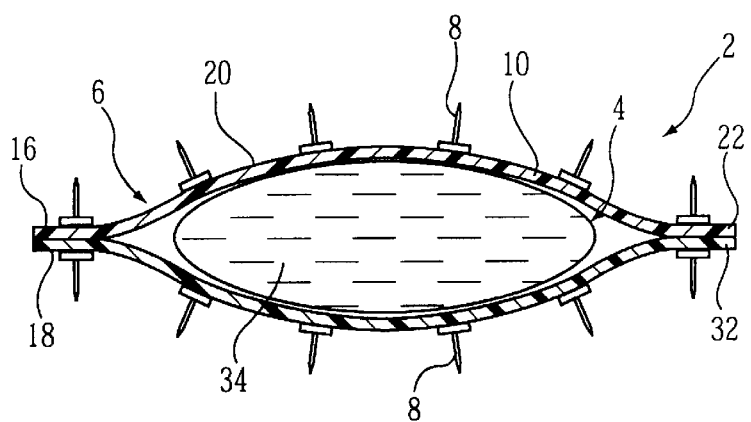
FIG. 3 is a cross-sectional view of the insecticide packet of FIG. 1.

The lower panel 18 of the pocket 6 is fabricated in a similar fashion to the upper panel 16, having a web 30 with an edge 32 adapted to be sealed to the upper panel 16. Preferably, the edge 22 of the upper panel 16 and the edge 32 of the lower panel 18 are adapted to be sealed to each other, as illustrated by FIG. 3. Returning to FIG. 2, the web 30 may be constructed of the same materials as the web 10 or the web 20. However, it is more preferable that the web 30 be water-repellent rather than gas-permeable. It is preferred, but not necessary, that the web 30 also be penetrable by the mouthparts of a biting insect.

The lower panel 18 of the pocket 6 is provided with a plurality of pins 8 extending downwardly from the web 30. The pins 8 provided with the lower panel 18 are of the same type as the pins 8 provided with the upper panel 16, and may be attached to the web 30 in the same manner as that by which the pins 8 are attached to the upper panel 16.

Referring to FIG. 3, which presents a cross-sectional view of the packet 2 of FIG. 1, the upper panel 16 and the lower panel 18 of the pocket 6 are arranged so the web 20 of the upper panel 16 is in contact with a substantial area of the web 10 of the envelope 4. Close contact between the web 20 and the web 10 facilitates the transfer of volatile components of the insecticidal composition 34 to the ambient environment of the packet 2, where the volatile components may attract biting insects. Such contact also enables the biting insects to readily penetrate both the web 20 and the web 10 to gain access to the insecticidal composition 34 within the envelope 4.

Figure 4:
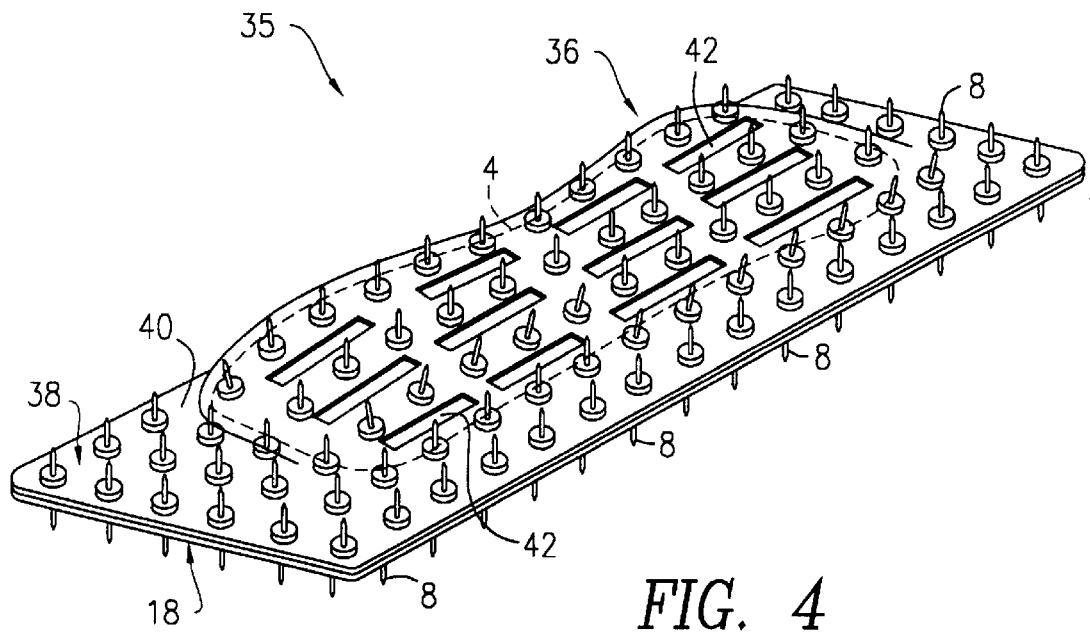
FIG. 4 is a perspective view of a second preferred embodiment of an insecticide packet according to the present invention.

Referring to FIG. 4, another preferred insecticide packet 35 comprises the envelope 4 of the packet 2 (see FIG. 2) within an outer pocket 36. The outer pocket 36 comprises a lower panel 18, having the same general structure as the lower panel 18 of the outer pocket 6 (see FIG. 2), which is joined to an upper panel 38 having a web 40 with openings 42. The outer pocket 36 is provided with a plurality of outwardly projecting pins 8 in the same manner as that described for the outer pocket 6 of the packet 2 (see FIGS. 1, 2). The openings 42, preferably, are disposed between adjacent rows of the pins 8.

Figure 5:
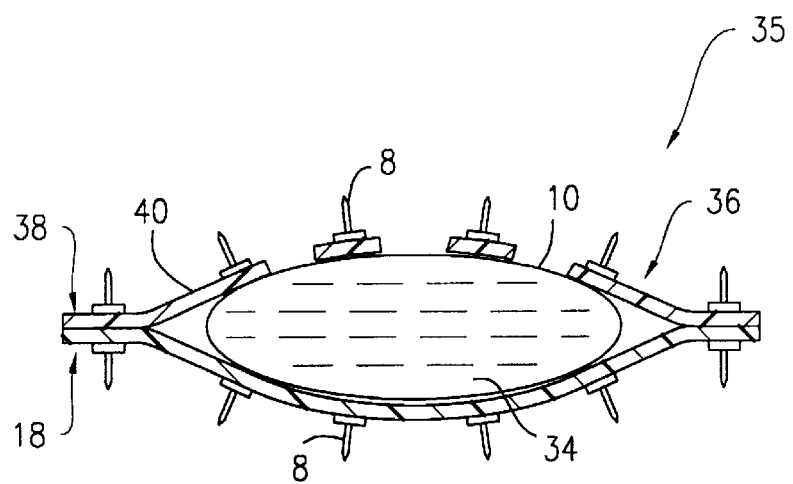
FIG. 5 is a cross-sectional view of the insecticide packet of FIG. 4.

As shown in FIG. 5, which presents a cross-sectional view of the packet 35 of FIG. 4, the upper panel 38 and the lower panel 18 of the pocket 36 are arranged so that the web 10 of the envelope 4 is exposed through at least some of the openings 42 in web 40, allowing the volatile components of the insecticidal composition 34 that permeate through the web 10 to directly enter the ambient environment of the packet 35. Such exposure of the web 10 also provides biting insects with direct access to the web 10. Because the web 10 is exposed to the ambient environment, the material from which the web 40 is fabricated does not need to be permeable to volatile compounds or penetrable by the mouthparts of the biting insect.

Figure 6:
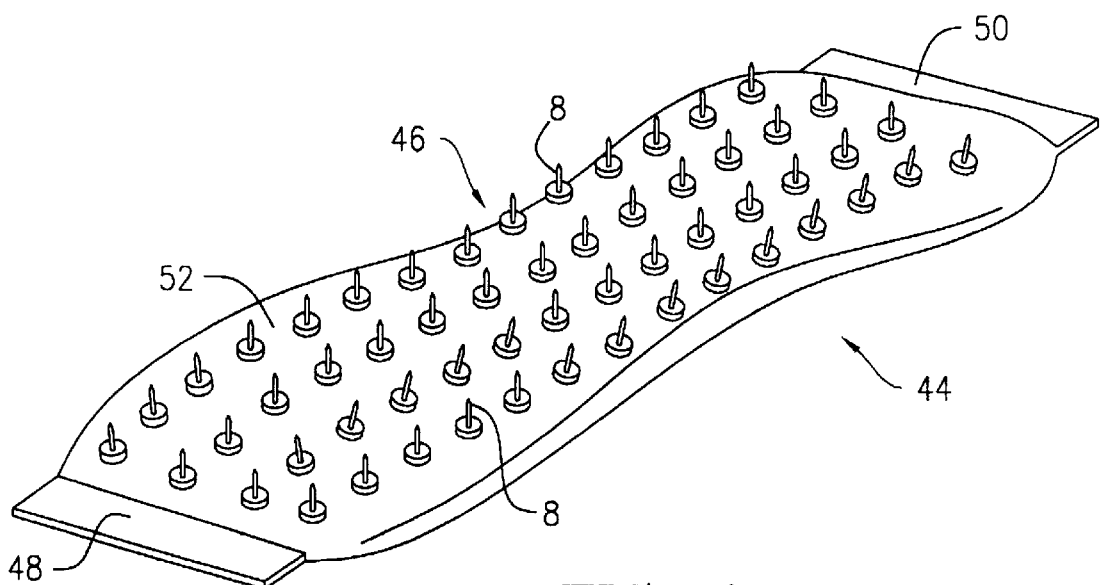
FIG. 6 is a perspective view of a third preferred embodiment of an insecticide packet according to the present invention.

Referring to FIG. 6, another preferred insecticide packet 44 comprises an envelope 46, preferably in the shape of a tube with opposed sealable ends 48, 50, for enclosing an insecticidal composition. The envelope 46 comprises a permeable web 52 of the same general type as the permeable web 10 of the packet 2 (see FIG. 2). The packet 44 does not include an outer pocket to protect the envelope 46, and, therefore, is fabricated to inhibit the infiltration of water into the envelope 46. Suitable gas-permeable web materials may be selected from those discussed hereinabove with respect to the web 10 of packet 2 (see FIG. 2).

The envelope 46 is provided with a plurality of pins 8 extending outwardly from the web 52. The structure of the pins 8 and the manner by which they are attached to the envelope 46 are similar to those discussed hereinabove for the pins 8 of packet 2 (see FIG. 2).

Figure 7:
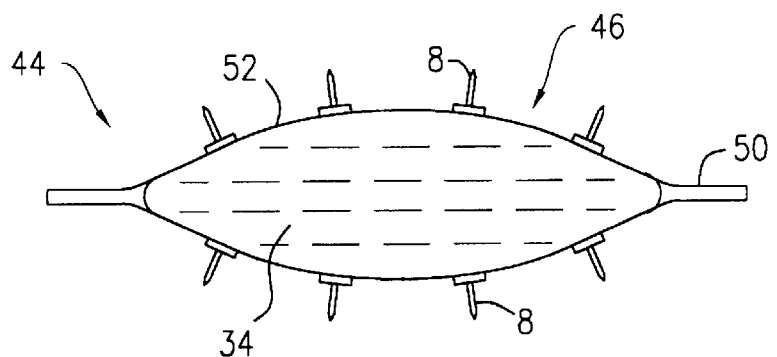
FIG. 7 is a cross-sectional view of the insecticide packet of FIG. 6.

Referring to FIG. 7, which presents a cross-sectional view of the packet 44 of FIG. 6, an insecticidal composition 34 within the envelope 46 should contact a substantial area of the web 52. Such contact facilitates the transfer of the volatile components of the insecticidal composition 34 to the ambient environment of the packet 44 and provides a biting insect with immediate access to the insecticidal composition 34 simply by penetrating the web 52.

Referring to FIG. 8, an insecticide packet assembly 54, comprising an insecticide packet 2 (also see FIG. 1), is provided with a buoyant support 56 that enables the assembly 54 to be floated on water. The buoyant support 56 has an upper surface 58 that supports the packet 2 and includes an opening 60 over which the packet 2 may rest. The assembly 54 is provided with a handle 62, such as a cord, by means of which the assembly 54 may be placed on the water, secured to a fixed object to anchor the assembly 54 in position, or removed from the water.

Referring to FIG. 9, the buoyant support 56 and the packet 2 are arranged in the assembly 54 so that at least a portion of the upper web 20 (see also FIG. 3) is exposed above the water line 64 and is, thereby, made accessible to biting insects. The buoyant support 56 may be fabricated from a material having an appropriate density and resistance to water logging, including low-density solid materials such as styrofoam or wood, or air-filled structures, such as inflatable bladders.

Preferably, the insecticidal composition 34 includes a stomach poison for the types of biting insect targeted by the insecticide package (i.e., a substance that is poisonous when ingested by the biting insect) mixed with a food that is preferred by the biting insects. For example, a combination of boric acid and cattle blood may be effective to kill female biting insects, including mosquitoes. Other types of poison may be used, such as the pyrethroids or organophosphates used for fogging, as long as they are effective as stomach poisons. Volatile organic compounds, such as lactic acid, uric acid, or odoriferous compounds from the food itself, may also be included in the insecticidal composition 34 to attract the biting insects to the insecticide packet.

The present invention provides a means for controlling the prevalence of biting insects while reducing the need for the current practice of extensive spraying or fogging. The invention provides a means for preferentially delivering poison to the adult female insect before she is able to lay her eggs, thereby interrupting the reproductive cycle. The gas-permeable envelope of the insecticide packet effectively inhibits the release of the insecticidal composition to the ambient environment, while allowing the release of volatile insect attractants. An additional degree of protection is realized by fabricating the packet from materials that are both gas-permeable and liquid-repellent, as such materials inhibit the release of the insecticide and infiltration of water that could damage the integrity of the packet. The simple structure of the packets and their small size allow them to be manufactured inexpensively and quickly deployed. Moreover, the packets can be manufactured using colors that preferentially attract insects and/or provide visual contrast for easy retrieval of the packets. Different combinations of attractants, foods and poisons may be deployed to target particular species of biting insects in the various environments in which they are found. Effective combinations can be readily determined from the published literature or by experimentation.

It should be understood that the embodiments described herein are merely exemplary and that a person skilled in the art may make many variations and modifications thereto without departing from the spirit and scope of the present invention. All such variations and modifications, including those discussed above, are intended to be included within the scope of the invention as defined in the appended claims. For example, the insecticide packets may be manufactured with various types of projections in place of the pins to discourage non-targeted animals from attempting to ingest the packets or their contents. The pins or other projections may be distributed over one side of the packet, instead of both, or eliminated from the packet entirely without affecting the invention's ability to deliver poison to the biting insect. The envelope itself may be formed by an upper panel and a lower panel, in the same manner as the outer pocket 6 (see FIG. 2). The packets may be made buoyant using arrangements of air bladders or any of a variety of buoyant structures. For example, small air bladders may be placed within the voids 66 (see FIG. 9) between the envelope 4 and pocket 6 in place of the buoyant support 56, or the envelope 4 and pocket 6 may be arranged so that the voids 66 provide the desired degree of buoyancy. If a buoyant support 56 is provided, the packet 2 may be secured within the opening 60 or the buoyant support may be provided without an opening. A cord or other handle (see FIG. 8) may be provided on the buoyant structures or on the insecticide packet itself.

I claim:

1. A device for deploying insecticide for killing biting insects, comprising an envelope for enclosing an insecticide for ingestion by a biting insect, said envelope including a permeable portion which is penetrable by the mouth parts of the biting insect; and a plurality of pins extending outwardly from said envelope.

2. The device of claim 1, wherein said envelope includes a tube having opposed sealable ends.

3. The device of claim 1, wherein each of said pins has an end affixed to said envelope.

4. The device of claim 1, wherein said permeable portion includes a water-repellent, gas-permeable fabric.

5. A device for deploying insecticide for killing biting insects, comprising an envelope for enclosing an insecticide for ingestion by a biting insect, said envelope including a permeable portion which is penetrable by the mouth parts of the biting insect; a pocket enclosing at least a portion of said envelope such that said permeable portion is accessible to the mouthparts of the biting insect; and a plurality of pins extending outwardly from said pocket.

6. The device of claim 5, wherein said pocket has openings such that said permeable portion is accessible to the mouthparts of the biting insect through said openings.

7. The device of claim 5, therein each of said pins has an end affixed to said pocket.

8. The device of claim 5, wherein said pocket includes a water-repellent, gas-permeable fabric.

9. The device of claim 1, further comprising a buoyant member disposed so that said device may float on water with at least a portion of said permeable portion above the water line when said envelope encloses an insecticide.

10. The device of claim 9, wherein said buoyant member is disposed outside of said envelope so as to support said envelope.

11. The device of claim 10, wherein said buoyant member includes a pocket enclosing at least a portion of said envelope.

12. The device of claim 1, wherein said envelope encloses an insecticide.

13. The device of claim 12, wherein said insecticide includes a stomach poison for the biting insect mixed with a liquid food for the biting insect.

14. The device of claim 13, werein said liquid food includes animal blood.

15. The device of claim 12, wherein said insecticide includes a volatile chemical attractant for the biting insect.

16. A device for deploying insecticide for killing biting insects, comprising an envelope for enclosing an insecticide for ingestion by a biting insect, said envelope including a permeable web which is penetrable by the mouth parts of the biting insect; a pocket including a gas-permeable, liquid repellent fabric and enclosing at least a portion of said envelope; a plurality of pins extending outwardly from said pocket, and a buoyant member disposed so that said device may float on water with at least a portion of said permeable web above the water line when said envelope encloses an insecticide.

17. A device for deploying insecticide for killing biting insects, comprising a tube having opposed sealable ends for enclosing an insecticide for ingestion by a biting insect, said tube including a permeable web that is penetrable by the mouth parts of the biting insect; a plurality of pins extending outwardly from said tube; and a buoyant member disposed so that said device may float on water with at least a portion of said permeable web above the water line when said envelope encloses an insecticide.

* * * * *